US008505943B2

(12) United States Patent  (10) Patent No.: US 8,505,943 B2
Barron                    (45) Date of Patent:     Aug. 13, 2013

(54) CANTILEVERED, VEHICLE SIDE MOUNT SAFETY GUARD

(75) Inventor: Mark Bowen Barron, Los Angeles, CA (US)

(73) Assignee: Public Transportation Safety Int'l Corp., Los Angeles, CA (US)

( * ) Notice: Subject to any disclaimer, the term of this patent is extended or adjusted under 35 U.S.C. 154(b) by 354 days.

(21) Appl. No.: 12/844,575

(22) Filed: Jul. 27, 2010

(65) Prior Publication Data

US 2011/0018289 A1  Jan. 27, 2011

Related U.S. Application Data

(60) Provisional application No. 61/228,833, filed on Jul. 27, 2009.

(51) Int. Cl.
 *B60R 19/54* (2006.01)
(52) U.S. Cl.
 USPC ............................. 280/160; 293/58
(58) Field of Classification Search
 USPC .............. 280/160, 762, 770, 847, 152.2, 848, 280/849, 851, 852, 853, 854, 159; 293/58, 293/128; 296/180.4, 180.1, 180.2, 187.04, 296/198; 89/36.08
 See application file for complete search history.

(56) References Cited

U.S. PATENT DOCUMENTS

| 3,450 A | 2/1844 | Tolles |
| 217,676 A | 7/1879 | Brown |
| 223,473 A | 1/1880 | Brisac |
| 346,762 A | 8/1886 | Marston |
| 354,831 A | 12/1886 | French |
| 381,881 A * | 4/1888 | Mahon .............................. 293/8 |
| 587,060 A | 7/1897 | Noraconk |
| 711,569 A * | 10/1902 | Hollis ............................. 293/58 |
| 993,448 A * | 5/1911 | Hunt ............................. 280/159 |
| 1,002,114 A | 8/1911 | Barnes |
| 1,050,405 A * | 1/1913 | Van Gelder ..................... 293/58 |
| 1,065,055 A | 6/1913 | Lawrence |
| 1,132,147 A * | 3/1915 | Arbeiter ........................ 280/160 |
| 1,222,828 A | 4/1917 | Weinberg |
| 1,232,835 A | 7/1917 | Ostrowiecki |
| 1,372,081 A * | 3/1921 | Myers .......................... 280/848 |
| 1,397,825 A * | 11/1921 | Thompson ..................... 293/58 |
| 1,411,254 A | 4/1922 | Braucci |
| 1,485,332 A * | 2/1924 | Edwards ....................... 293/107 |
| 1,511,085 A * | 10/1924 | McIntyre ...................... 293/128 |
| 1,553,656 A * | 9/1925 | Williams ...................... 293/126 |

(Continued)

FOREIGN PATENT DOCUMENTS

| GB | 809624 | 2/1959 |
| JP | 04-176784 | 6/1992 |

*Primary Examiner* — Katy M Ebner
*Assistant Examiner* — Brodie Follman
(74) *Attorney, Agent, or Firm* — Diederiks & Whitelaw, PLC

(57) ABSTRACT

A safety guard which functions to push objects lying in the path of a vehicle out of the path of the wheels of the vehicle, such as a school bus, for safety purposes includes a front guard positioned at an angle in front of a wheel of the vehicle and is mounted to a side panel of the vehicle such that the frontal guard is supported in a cantilevered manner in front of the wheel. This configuration provides for a substantially universal mounting arrangement that can be particular advantageous in connection with school buses and other vehicles which are not provided with underbody frame and support structure closely adjacent to the vehicle wheel.

19 Claims, 3 Drawing Sheets

(56) References Cited

U.S. PATENT DOCUMENTS

| | | | |
|---|---|---|---|
| 1,730,733 A * | 10/1929 | Judd | 135/88.05 |
| 1,805,933 A * | 5/1931 | Victor | 280/160 |
| 1,848,310 A * | 3/1932 | Brown | 293/58 |
| 1,885,411 A | 11/1932 | Lilley | |
| 1,899,937 A * | 3/1933 | Brown | 280/847 |
| 2,017,227 A * | 10/1935 | Barnhart | 280/849 |
| 2,038,234 A * | 4/1936 | Olen | 280/851 |
| 2,336,536 A * | 12/1943 | Ferguson | 280/848 |
| 2,605,119 A * | 7/1952 | Earnest | 280/849 |
| 2,647,763 A * | 8/1953 | Hudson | 280/762 |
| 3,337,238 A * | 8/1967 | Weasel, Jr. | 280/851 |
| 3,341,222 A * | 9/1967 | Roberts | 280/851 |
| 3,560,021 A * | 2/1971 | Watson | 280/851 |
| 3,675,943 A * | 7/1972 | Moore et al. | 280/851 |
| 3,721,459 A * | 3/1973 | Lea | 280/851 |
| 3,784,226 A | 1/1974 | Wilfert et al. | |
| 3,794,373 A | 2/1974 | Manning | |
| 3,809,167 A | 5/1974 | Glider | |
| 3,866,943 A * | 2/1975 | Innis | 280/851 |
| 3,874,697 A * | 4/1975 | Thompson | 280/851 |
| 3,934,901 A * | 1/1976 | Hammerly | 280/851 |
| 4,124,221 A * | 11/1978 | Goings | 280/851 |
| 4,203,623 A | 5/1980 | Fenner et al. | |
| 4,205,861 A * | 6/1980 | Roberts et al. | 280/851 |
| 4,262,953 A * | 4/1981 | McErlane | 296/180.4 |
| 4,325,563 A * | 4/1982 | Brandon et al. | 280/851 |
| 4,362,310 A * | 12/1982 | Goodall | 280/157 |
| 4,377,294 A * | 3/1983 | Lockwood et al. | 280/851 |
| 4,627,594 A * | 12/1986 | Reed | 248/632 |
| 4,640,541 A * | 2/1987 | FitzGerald et al. | 296/180.1 |
| 4,688,824 A * | 8/1987 | Herring | 280/762 |
| 4,763,939 A | 8/1988 | Zhu | |
| 4,877,266 A * | 10/1989 | Lamparter et al. | 280/762 |
| 4,944,104 A * | 7/1990 | Kowalczyk | 37/231 |
| 5,027,990 A * | 7/1991 | Sonnenberg | 224/42.2 |
| 5,199,762 A * | 4/1993 | Scheele et al. | 296/180.1 |
| 5,280,990 A * | 1/1994 | Rinard | 296/180.1 |
| 5,333,923 A * | 8/1994 | Whitfield | 293/128 |
| 5,462,324 A * | 10/1995 | Bowen et al. | 293/15 |
| 5,735,560 A * | 4/1998 | Bowen et al. | 293/15 |
| 5,823,586 A * | 10/1998 | Marley | 293/126 |
| 5,847,642 A * | 12/1998 | Esposito et al. | 340/433 |
| 5,961,137 A * | 10/1999 | Knight | 280/160 |
| 6,007,102 A * | 12/1999 | Helmus | 280/849 |
| 6,095,562 A * | 8/2000 | Busse | 280/762 |
| 6,152,469 A * | 11/2000 | Gadowski | 280/154 |
| 6,263,996 B1 * | 7/2001 | Welch | 180/271 |
| 6,554,306 B1 * | 4/2003 | Gaspar | 280/160 |
| 6,827,372 B2 * | 12/2004 | Barr et al. | 280/847 |
| 6,886,862 B2 * | 5/2005 | Matthew | 280/848 |
| 7,192,078 B2 * | 3/2007 | Buley et al. | 296/180.1 |
| 7,258,366 B2 * | 8/2007 | Yingling et al. | 280/851 |
| 7,793,985 B1 * | 9/2010 | Coloma | 280/848 |
| 7,806,464 B2 * | 10/2010 | Cardolle | 296/180.4 |
| 7,942,470 B2 * | 5/2011 | Boivin et al. | 296/180.4 |
| 7,992,923 B2 * | 8/2011 | Dayton | 296/180.4 |
| D657,293 S * | 4/2012 | Barron | D12/185 |
| D657,724 S * | 4/2012 | Barron | D12/185 |
| 8,226,158 B1 * | 7/2012 | Jackson | 296/198 |
| 8,322,778 B1 * | 12/2012 | Pfaff | 296/180.4 |
| 2001/0004873 A1 | 6/2001 | Lamparter | 116/28 R |
| 2002/0024213 A1 * | 2/2002 | Hawes | 280/854 |
| 2003/0141714 A1 * | 7/2003 | Matthew | 280/848 |
| 2004/0140663 A1 * | 7/2004 | Barr et al. | 280/847 |
| 2005/0104390 A1 * | 5/2005 | Norelius | 293/128 |
| 2005/0110266 A1 * | 5/2005 | Barr et al. | 280/847 |
| 2011/0018289 A1 * | 1/2011 | Barron | 293/58 |
| 2012/0248799 A1 * | 10/2012 | Barron | 293/58 |
| 2012/0286528 A1 * | 11/2012 | Barron | 293/58 |

* cited by examiner

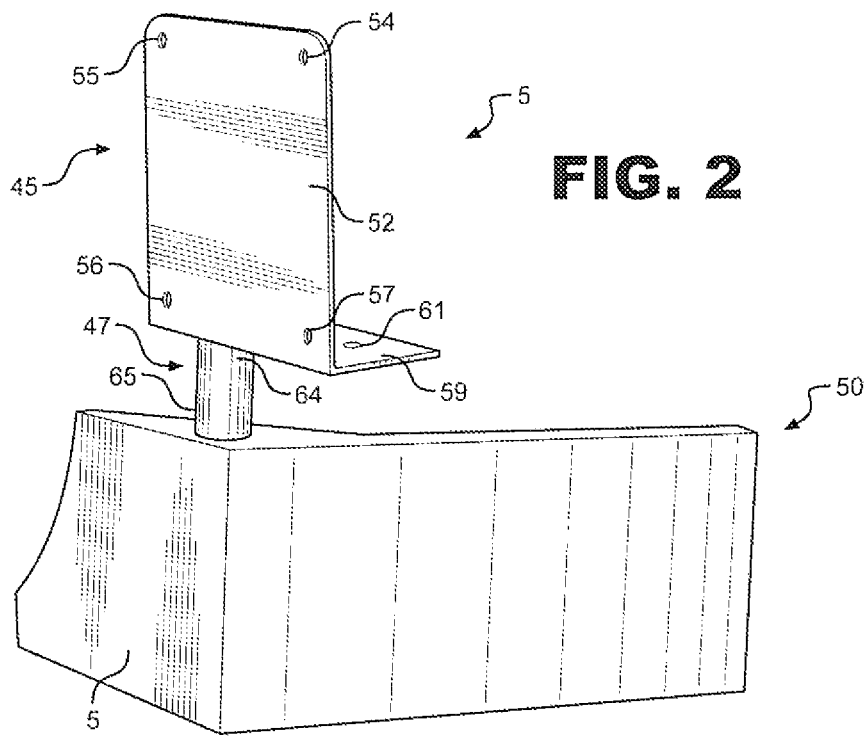
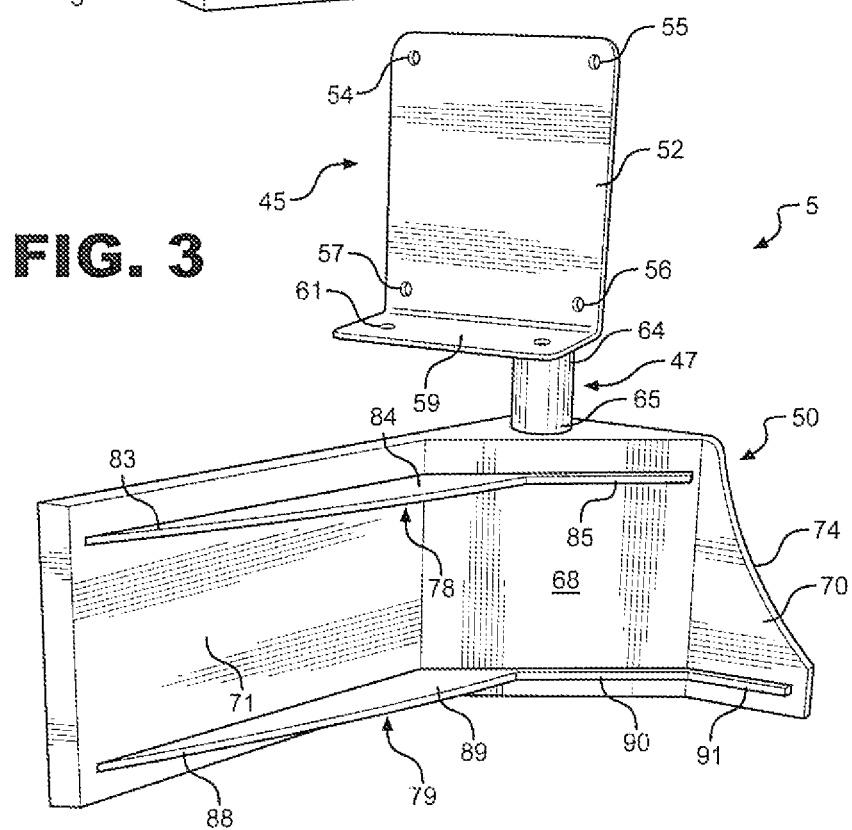

US 8,505,943 B2

CANTILEVERED, VEHICLE SIDE MOUNT SAFETY GUARD

CROSS-REFERENCE TO RELATED APPLICATIONS

The present invention claims the benefit of U.S. Provisional Patent Application Ser. No. 61/228,833 entitled "Cantilevered, Vehicle Side Mount Safety Guard" filed Jul. 27, 2009.

BACKGROUND OF THE INVENTION

1. Field of the Invention

The present invention pertains to the art of vehicle safety devices and, more particularly, to a safety device mounted to a side body panel of a vehicle and including a guard portion which is supported in front on a wheel set of the vehicle, in a cantilevered manner, for deflecting animate and inanimate objects from in front of the vehicle wheels.

2. Discussion of the Prior Art

Buses are commonly employed for various transportation purposes. For instance, buses are widely employed in metropolitan mass transit systems. Unfortunately, there are inherent dangers associated with the operation of buses. Many of the most serious of these injuries are a result of individuals being run over by the bus, such as when a person slips and falls in the road adjacent a wheel of the bus and the bus crushes a limb or other body part of the individual. Correspondingly, inanimate objects can also be crushed.

To address these concerns, it has been proposed in the art to mount a safety guard directly in front of wheels on a bus to establish a safety barrier between the wheels and objects. More specifically, as represented by U.S. Pat. Nos. 5,462,324 and 5,735,560, it is known to mount a safety barrier to undercarriage structure of a vehicle, such as a bus, with the safety barrier including a lower edge extending directly along a ground surface. The safety barrier is fixedly supported at various locations, such as to axle, frame and/or suspension structure. The safety barrier is angled such that, if an object is encountered during movement of the bus, the safety barrier forces the object out from under the vehicle to a position out of the path of the vehicle wheels.

In addition to mass transit buses, school buses are widely employed in connection with transporting students for educational purposes. Of course, still other types of buses also exist. Certainly, each of these additional types of buses can benefit from incorporating safety guards. However, many of these buses, particularly school buses, are constructed in quite a different manner than most other buses. Although school buses could receive axle and/or suspension mounted safety guards, the undercarriage frame structure of school buses is distinct such that many of the advantageous methods of mounting safety guards as disclosed in the '324 and '560 patents are simply not well suited for this application. In particular, school buses have undercarriage body portions which are raised quite high, thereby making mounting a safety guard to this structure quite difficult. For at least this reason, various types of buses, particularly school buses, are simply not provided with these known safety guard devices, even though serious injuries and even deaths can be avoided with the use of the safety guards.

Based on the above, there exists the need for a more feasible mounting arrangement for a vehicle underbody safety guard. In particular, there is seen to exist a need for a safety barrier mounting arrangement which will enable safety guards to be readily mounted to a wide range of vehicles in an effective and substantially universal manner, thereby expanding the type of vehicles which can be equipped with injury and even lifesaving safety guards.

SUMMARY OF THE INVENTION

The present invention is directed to providing a safety guard for a vehicle, such as a school bus, including a front guard positioned at an angle in front of a wheel of the vehicle that will function to push individuals and inanimate objects lying in the path of the vehicle out of the path of the wheels for safety purposes. The safety guard is positioned close enough to the ground so that, if an object is encountered, the safety barrier forces the object out from under the vehicle and out of the wheel path. In accordance with the invention, the safety guard is mounted to a side panel of the vehicle such that the frontal guard is supported in a cantilevered manner in front of the wheels. This configuration provides for a substantially universal mounting arrangement that can be particular advantageous in connection with school buses and other vehicles which are not provided with underbody frame and support structure closely adjacent to the vehicle wheels.

While the invention has particular utility in school buses, it can also be used to prevent injuries in a wide range of vehicles. The safety guard can be mounted with a single side mounting plate, multiple interconnected mounting plates or integrated with a wheel cover. Additional objects, features and advantages of the present invention will become more readily apparent from the following detailed description of preferred embodiments when taken in conjunction with the drawings wherein like reference numerals refer to corresponding parts in the several views.

BRIEF DESCRIPTION OF THE DRAWINGS

FIG. 2 is a front perspective view of the safety guard assembly of FIG. 1;

FIG. 3 is a rear perspective view of the safety guard assembly of FIG. 1;

DETAILED DESCRIPTION OF THE PREFERRED EMBODIMENTS

Figure 1:
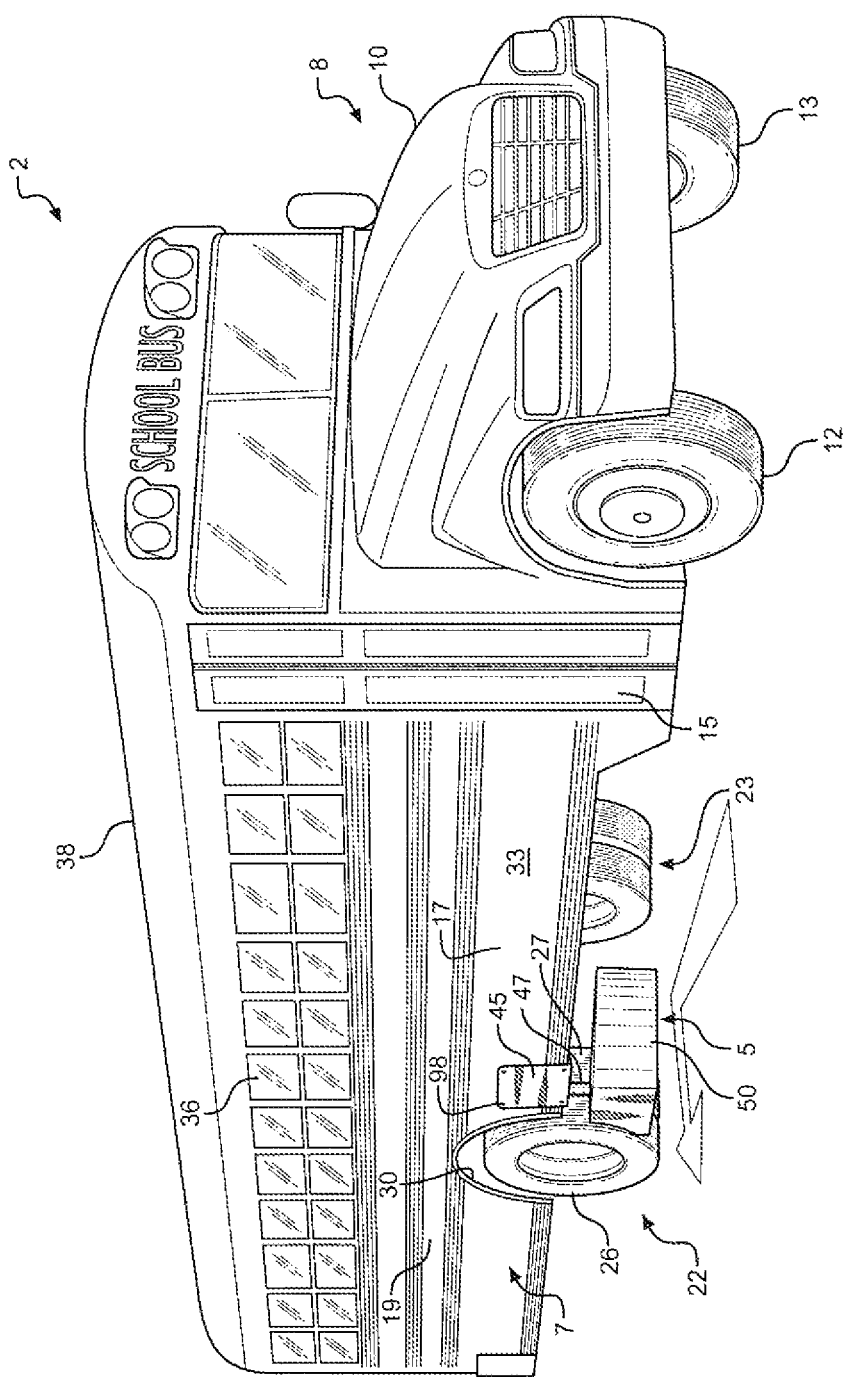
FIG. 1 is a perspective view of a school bus having mounted thereto a safety guard assembly in accordance with a first embodiment of the invention.

With initial reference to FIG. 1, a vehicle 2, shown as a school bus, has attached thereto a safety guard 5 constructed in accordance with the present invention. In general, vehicle 2 includes a body 7 having a front end 8 including a hood 10 beneath which is provided an engine (not shown), and front steerable wheels 12 and 13. Behind front wheels 12 and 13 is shown a forward most side door 15 which leads to a middle section 17 of vehicle body 7 and a rear end section 19. Supporting rear end section 19 is a pair of rear wheel assemblies 22 and 23. Each rear wheel assembly 22, 23 is shown to include dual wheels 26 and 27 arranged in a wheel well 30 created in a side panel 33 of vehicle body 7. Also provided in side panel 33 are various fore-to-aft spaced windows 36 which are vertically arranged below a roof 38. More importantly, in accordance with the present invention, safety guard 5 includes a mounting plate 45, a support post 47 and a frontal guard 50 as will be detailed below.

With reference to FIGS. 2 and 3, mounting plate 45 of safety guard 5 includes a side plate portion 52 provided with a plurality of spaced holes 54-57, and a base plate portion 59 provided with holes 61. In the embodiment shown, base plate portion 59 extends substantially perpendicular from side plate portion 52 such that mounting plate 45 is generally L-shaped in side-view. Support post 57 includes a first end 64 fixed to base plate portion 59 and a second end 65 that is secured to a corner body portion 68 of safety guard 5. In addition to corner body portion 68, safety guard 5 also includes a side body portion 70 and a frontal body portion 71 defining frontal guard 50. As clearly shown in these figures, side body portion 70 includes an arcuate terminal edge 74 remote from frontal body portion 71.

As best shown in FIG. 3, frontal guard 50 is also provided with an upper support gusset 78 and a lower support gusset 79. More specifically, upper support gusset 78 tapers from a first end portion 83 to an intermediate portion 84 at a junction with corner body portion 68. Intermediate portion 84 extends to a second end portion 85 within corner body portion 68. In a similar manner, lower support gusset 79 extends from a first end portion 88 to an intermediate portion 89, a second end portion 90 and further includes an extension portion 91 which projects along side body portion 70 below arcuate terminal edge 74.

With this construction, safety guard 5 can be advantageously and efficiently mounted directly to side panel 33 of vehicle body 7, such as in front of rear wheel assembly 22 as clearly shown in FIG. 1. More specifically, side plate portion 52 is positioned against side panel 33 and a plurality of mechanical fasteners 98 fixedly secure safety guard 5 to vehicle body 7 through holes 54-57. At the same time, additional fasteners extend through holes 61 and 62 of base plate portion 59 and into a side panel support frame rail (not shown) in further fixing safety guard 5. When mounting plate 45 is secured in this fashion, frontal guard 50 is positioned in front of wheels 26 and 27, with arcuate terminal edge 74 being spaced from and conforming to wheel 26 at a lower forward portion. At the same time, frontal guard 50 is maintained a few inches, generally in the order of 3-5 inches, above a ground surface (not separately labeled), while being supported in a cantilevered manner through mounting plate 45 and support posts 47. Therefore, even though vehicle 2 does not include frame and other structure located in a position which would enable underbody and multi-point attachments for frontal guard 50, frontal guard 50 is still positioned in a manner which is slightly angled rearwardly and outwardly from a center line of vehicle 2 with this cantilevered mounting arrangement so as to effectively function to push individuals and/or inanimate objects which may lie in the path of vehicle 2 out of the path of wheels 26 and 27, thereby preventing the individuals from being crushed or otherwise damaged by wheels 26 and 27 of vehicle 2.

Figure 4:
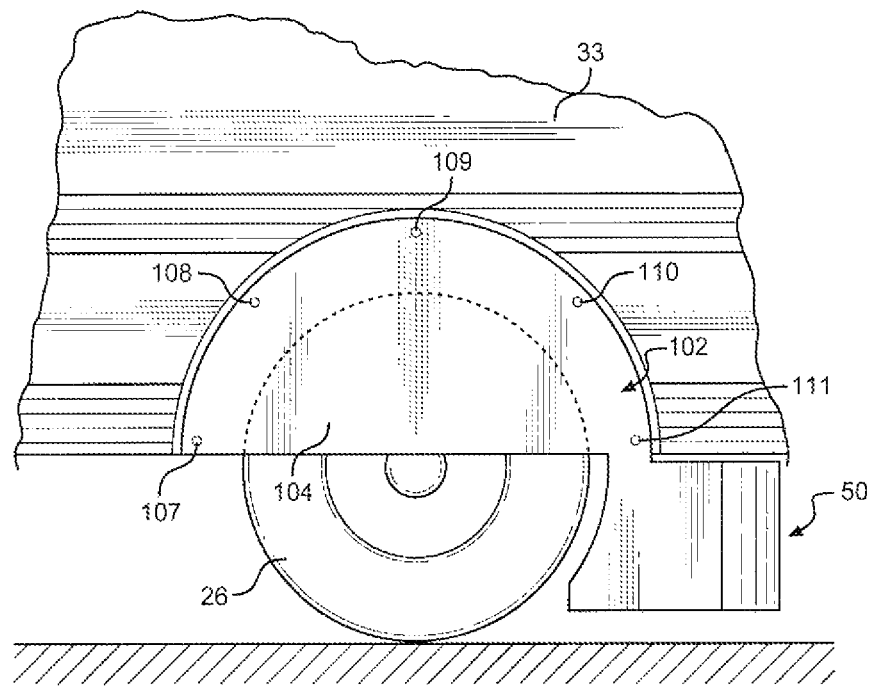
FIG. 4 is a perspective view of a portion of a school bus having mounted thereto a safety guard assembly in accordance with a second embodiment of the invention.

At this point, it should be recognized that the invention is particular concerned with providing a side mount for safety guard 5 that enables frontal guard 50 to be secured in front of wheels 26, 27 in a cantilevered manner. In accordance with another embodiment of the invention, this object is obtained by integrally forming side body portion 70, corner body portion 68 and frontal body portion 71, into a combination wheel well cover and safety guard 102 as shown in FIG. 4. More specifically, combination wheel well cover and safety guard 102 includes a wheel well cover plate 104 provided with various mounting points 107-111 used to fixedly secure wheel well cover portion 102 to side panel 33. In this manner, wheel well cover plate 104 covers approximately the upper half of wheel 26 while also fully supporting frontal guard 50 in a cantilevered manner.

Figure 5:
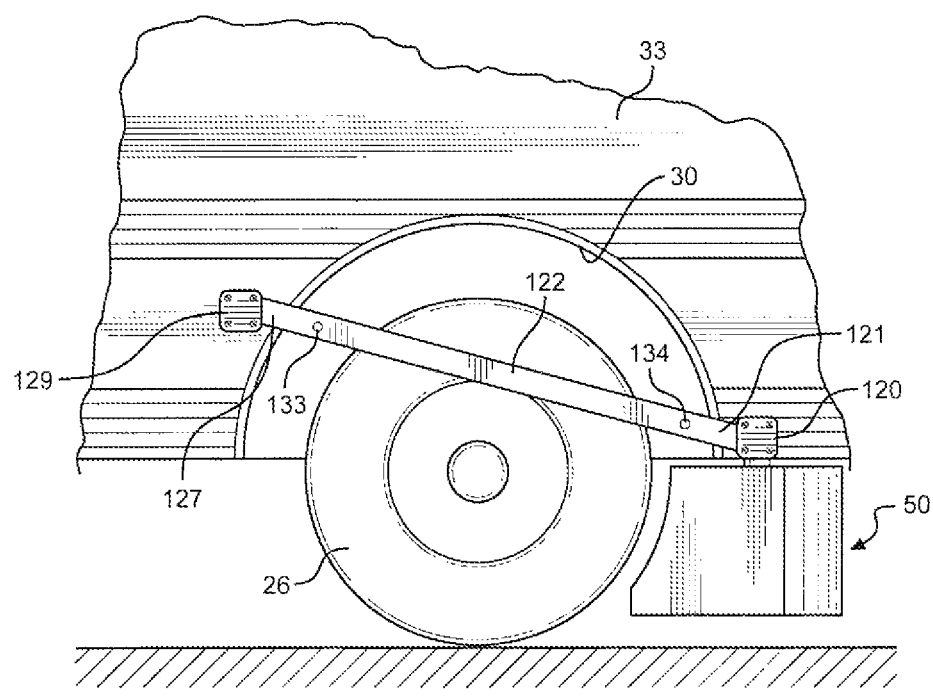
FIG. 5 is a perspective view of a portion of a school bus having mounted thereto a safety guard assembly in accordance with a third embodiment of the invention.

FIG. 5 shows a third embodiment of the invention which is more similar to the embodiment of FIGS. 1-3 in that frontal guard 50 is supported by post 47 and a first side plate 120 secured to side panel 33 to which is fixed a first end 121 of a cross bar 122. Cross bar 122 includes a second end 127 that is fixed to a second side plate 129 that is also secured through various fasteners (not labeled) to side panel 33. As clearly illustrated in FIG. 5, cross bar 122 is preferably provided with multiple apertures, such as those indicated at 133 and 134, which can be utilized in mounting a wheel well cover (not separately shown) similar to that of the embodiment of FIG. 4, with the wheel well cover preferably extending over first and second side plates 120 and 129 for aesthetic purposes.

In connection with each of the embodiments disclosed, the overall safety guard is preferably formed as a one-piece unit which is mounted in front of select vehicle wheels and across a portion of the underbody, such as in the order of 2 feet, while having a minimal gap between the safety barrier and the ground. The frontal guard can be formed of plastic, rubber, urethane, aluminum or steel, although other known materials could be used to create a physical barrier strong enough to push a child or adult from in front of the wheels. For instance, it would be possible to manufacture at least a portion of the frontal guard from recycled tire rubber or fiberglass. To reduce the weight and thickness of the frontal guard, it is possible to employ an inner wire mesh for internal strengthening without sacrificing overall effectiveness. Although not shown, the support post could be telescoping or otherwise vertically adjustable for lowering or raising the front guard to accommodate road clearance issues. In the embodiments employing a wheel cover, threaded clamps can be employed in securing the wheel cover to the side panel to more readily accommodate various wheel well sizes on different makes and models of vehicles. In addition, it should be realized that the side mount can be either exposed to the outside of the vehicle or inside of an outermost side panel or covering. In any case, although described with reference to preferred embodiments of the invention, it should be readily understood that various changes and/or modifications can be made to the invention without departing from the spirit thereof. In general, the invention is only intended to be limited by the scope of the following claims.

I claim:
1. A vehicle comprising:
a body having at least one side panel;
a pair of front steerable wheels spaced in a transverse direction of the body of the vehicle;
at least one pair of transversely spaced rear wheels which are longitudinally spaced from the front steerable wheels;
a door provided along the at least one side panel; and
a safety guard assembly for deflecting animate body parts from in front of at least one of the front and rear wheels, said safety guard assembly including:
a mounting plate secured along the at least one side panel; and
a frontal guard piece attached to the mounting plate and cantilevered beneath the body in front of the at least one of the front and rear wheels so as to be positioned to prevent the animate body parts from being run-over and crushed by the at least one of the front and rear wheels.

2. The vehicle according to claim 1, said mounting plate including a side plate portion directly mounted to the at least one side panel.

3. The vehicle according to claim 2, further comprising:
   a plurality of spaced holes formed in the side plate portion; and
   a plurality of mechanical fasteners extending through the plurality of spaced holes to fixedly secure the mounting plate to the at least one side panel.

4. The vehicle according to claim 2, wherein said mounting plate is generally L-shaped, further including a base plate fixed to the side plate portion and extending beneath the body of the vehicle.

5. The vehicle according to claim 1, said safety guard assembly including a frontal body portion, defining the frontal guard piece, a side body portion, and a corner body portion interconnecting the frontal body portion and the side body portion.

6. The vehicle according to claim 5, said side body portion including an arcuate terminal edge conforming to and being closely spaced from the at least one of the front and rear wheels.

7. The vehicle according to claim 5, further comprising a support post interconnecting the mounting plate and the safety guard assembly.

8. The vehicle according to claim 7, wherein the support post directly connects the mounting plate to the corner body portion.

9. The vehicle according to claim 5, further comprising at least one gusset extending between and interconnecting the frontal body portion, the side body portion and the corner body portion.

10. The vehicle according to claim 1, wherein the mounting plate constitutes a wheel well cover.

11. The vehicle according to claim 10, said safety guard assembly including a frontal body portion, defining the frontal guard piece, a side body portion, and a corner body portion interconnecting the frontal body portion and the side body portion, said side body portion constituting an extension of the wheel well cover.

12. The vehicle according to claim 1, further comprising a cross bar fixed to each of the mounting plate and the at least one side panel for further mounting the frontal guard piece.

13. The vehicle according to claim 12, further comprising another mounting plate fixed to the at least one side panel, with the mounting plate and the another mounting plate being interconnected by the cross bar.

14. The vehicle according to claim 12, wherein the cross bar extends directly across the at least one of the front and rear wheels.

15. A safety guard assembly for deflecting animate body parts from in front of at least one of front and rear wheels of a vehicle comprising:

a mounting plate adapted to be secured along a side panel of the vehicle;
   a frontal guard piece attached to the mounting plate and adapted to be cantilevered beneath a body of the vehicle, in front of the at least one of the front and rear wheels so as to be positioned to prevent the animate body parts from being run-over and crushed by the at least one of the front and rear wheels;
   a side body portion, said side body portion including an arcuate terminal edge conforming to and being closely spaced from the at least one of the front and rear wheels; and
   a corner body portion interconnecting the frontal body portion and the side body portion.

16. A method of deflecting animate body parts from in front of a wheel of a vehicle including a body having at least one side panel, a pair of front steerable wheels spaced in a transverse direction of the body of the vehicle, at least one pair of transversely spaced rear wheels which are longitudinally spaced from the front steerable wheels, and a door provided along the at least one side panel, said method comprising:

securing a mounting plate along the at least one side panel of the vehicle;
   supporting a frontal guard piece from the mounting plate such that the frontal guard piece is cantilevered beneath the body and in front of the wheel;
   deflecting an animate body part from in front of the wheel by direct engagement with the frontal guard piece during movement of the vehicle so as to prevent the animate body part from being run-over and crushed by the wheel; and
   protecting the animate body from being run-over and crushed by the wheel with a safety guard assembly including a frontal body portion, defining the frontal guard piece, a side body portion, and a corner body portion interconnecting the frontal body portion and the side body portion, with said side body portion including an arcuate terminal edge conforming to and being closely spaced from the wheel below the body of the vehicle.

17. The method of claim 16, further comprising: supporting the frontal guard piece from a support post extending down from the mounting plate.

18. The method of claim 16, further comprising: supporting the frontal guard piece as an extension of a wheel well cover defining the mounting plate.

19. The method of claim 16, further comprising: supporting the frontal guard piece with a bar connected to the mounting plate and extending across the wheel.

* * * * *